(12) United States Patent
Lin et al.

(10) Patent No.: US 12,469,936 B2
(45) Date of Patent: Nov. 11, 2025

(54) BATTERY CELL, BATTERY, AND ELECTRIC APPARATUS WITH TAB INCLUDING TWO DIFFERENT CONNECTING PORTIONS

(71) Applicant: CONTEMPORARY AMPEREX TECHNOLOGY (HONG KONG) LIMITED, Hong Kong (CN)

(72) Inventors: Denghua Lin, Ningde (CN); Long Chen, Ningde (CN); Xinxiang Chen, Ningde (CN); Yulian Zheng, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/015,145

(22) Filed: Jan. 9, 2025

(65) Prior Publication Data
US 2025/0149753 A1  May 8, 2025

Related U.S. Application Data

(63) Continuation of application No. PCT/CN2023/099862, filed on Jun. 13, 2023.

(30) Foreign Application Priority Data

Jul. 14, 2022 (CN) .......................... 202210823644.5

(51) Int. Cl.
*H01M 50/533* (2021.01)
*H01M 50/103* (2021.01)
(Continued)

(52) U.S. Cl.
CPC ....... *H01M 50/533* (2021.01); *H01M 50/103* (2021.01); *H01M 50/474* (2021.01);
(Continued)

(58) Field of Classification Search
CPC ............ H01M 50/533; H01M 50/474; H01M 50/103; H01M 50/55; H01M 50/477
See application file for complete search history.

(56) References Cited

FOREIGN PATENT DOCUMENTS

| CN | 1750310 A | 3/2006 |
|---|---|---|
| CN | 101834307 A | 9/2010 |

(Continued)

OTHER PUBLICATIONS

WO 2022130450 English Translation (Year: 2022).*
(Continued)

*Primary Examiner* — Jimmy Vo
(74) *Attorney, Agent, or Firm* — ANOVA LAW GROUP, PLLC (57) ABSTRACT

A battery cell includes a housing, an electric terminal disposed on the housing, and an electrode assembly accommodated in the housing. The electrode assembly includes a main body portion and a tab extending out of an end face of the main body portion and including a first connecting portion configured to be connected to the electrode terminal and a second connecting portion configured to be connected to the main body portion. Along a length direction of the end face, at least part of the first connecting portion exceeds the second connecting portion. As the first connecting portion exceeds the second connecting portion in the length direction of the end face, the connectable range of the first connecting portion in the length direction of the end face can be expanded, facilitating direct connection of the first connecting portion with the electrode terminal.

15 Claims, 11 Drawing Sheets

(51) Int. Cl.
    *H01M 50/474*     (2021.01)
    *H01M 50/477*     (2021.01)
    *H01M 50/55*     (2021.01)

(52) U.S. Cl.
    CPC ......... *H01M 50/477* (2021.01); *H01M 50/55* (2021.01); *H01M 2220/20* (2013.01)

(56) References Cited

FOREIGN PATENT DOCUMENTS

| | | | | |
|---|---|---|---|---|
| CN | 105122530 A | 12/2015 | | |
| CN | 209526150 U | 10/2019 | | |
| CN | 111769249 A | 10/2020 | | |
| JP | 2012014935 A | * | 1/2012 | |
| WO | WO-2011102368 A1 | * | 8/2011 | ............ B23K 26/00 |
| WO | 2014027606 A1 | | 2/2014 | |
| WO | WO-2022130450 A1 | * | 6/2022 | ........ H01M 10/0587 |

OTHER PUBLICATIONS

JP 2012014935 English Translation (Year: 2012).*
WO 2011102368 English Translation (Year: 2011).*
The World Intellectual Property Organization (WIPO) International Search Report for PCT/CN2023/099862 Jul. 24, 2023 6 Pages (including translation).

* cited by examiner

BATTERY CELL, BATTERY, AND ELECTRIC APPARATUS WITH TAB INCLUDING TWO DIFFERENT CONNECTING PORTIONS

CROSS-REFERENCE TO RELATED APPLICATIONS

This application is a continuation of International Application No. PCT/CN2023/099862, filed on Jun. 13, 2023, which claims priority to Chinese Patent Application No. 202210823644.5, filed on Jul. 14, 2022 and entitled "BATTERY CELL, BATTERY, AND ELECTRIC APPARATUS", which are incorporated herein by reference in their entirety.

TECHNICAL FIELD

This application pertains to the field of battery technologies, and in particular, to a battery cell, a battery, and an electric apparatus.

BACKGROUND

With the increasing depletion of natural resources and the worsening damage to the environment, there is a growing interest across various fields in apparatus that can store energy and effectively utilize stored energy. The battery cells can be combined into a system for using new renewable energy.

How the energy density of battery cells is increased is an important research direction in battery technologies.

SUMMARY

Embodiments of this application provide a battery cell, a battery, and an electric apparatus, which implement direct connection between a tab and an electrode terminal, thereby increasing the energy density of the battery.

According to a first aspect, an embodiment of this application provides a battery cell, including a housing, an electrode terminal, and an electrode assembly. The electrode terminal is disposed on the housing, and the electrode assembly is accommodated in the housing. The electrode assembly includes a main body portion and a tab, the tab extends out of an end face of the main body portion, the tab includes a first connecting portion and a second connecting portion, the first connecting portion is configured to be connected to the electrode terminal, and the second connecting portion is configured to be connected to the main body portion. Along a length direction of the end face, at least part of the first connecting portion exceeds the second connecting portion.

With the use of the foregoing structure, as the first connecting portion exceeds the second connecting portion in the length direction of the end face, the connectable range of the first connecting portion in the length direction of the end face can be expanded, facilitating direct connection of the first connecting portion with the electrode terminal. This optimizes the internal structure of the battery cell, increases the available space for the electrode assembly, and increases the energy density of the battery cell.

In some optional embodiments of this application, the first connecting portion is connected to the electrode terminal to form a connection region, and along a length direction of the end face, at least part of the connection region exceeds the second connecting portion.

With the use of the foregoing structure, as the connection region exceeds the second connecting portion along the length direction of the end face, a connection position between the first connecting portion and the electrode terminal can be on an exceeding portion of the first connecting portion. Even if a position where the tab is led out is not aligned with the electrode terminal, the tab can still be connected to the electrode terminal via the part of the first connecting portion exceeding the second connecting portion.

In some optional embodiments of this application, along the length direction of the end face, a size of the first connecting portion is greater than a size of the second connecting portion.

With the use of the foregoing structure, as the size of the first connecting portion is greater than the size of the second connecting portion in the length direction of the end face, the first connecting portion can obtain a larger area, facilitating connection to the electrode terminal.

In some optional embodiments of this application, a notch is provided at a joint between the second connecting portion and the main body portion.

With the use of the foregoing structure, the arrangement of the notch can shrink a size of a connection position of the second connecting portion to the main body portion, increasing a distance between the second connecting portion and another component in the battery cell (for example, an insulating plate between the electrode assembly and the first wall), thereby avoiding interference between the second connecting portion and other components.

In some optional embodiments of this application, the tab is L-shaped or T-shaped.

With the use of the foregoing structure, as the tab is arranged to be L-shaped or T-shaped, the size of the first connecting portion in the length direction of the end face can be significantly increased, facilitating connection of the tab with the electrode terminal. This also significantly reduces the size of the second connecting portion in the length direction of the end face, preventing the second connecting portion from contacting the protruding block.

In some optional embodiments of this application, the tab includes a positive electrode tab and a negative electrode tab, the positive electrode tab and the negative electrode tab are both located on the end face, the positive electrode tab and the negative electrode tab each include a first connecting portion and a second connecting portion, and the first connecting portion of the positive electrode tab and the first connecting portion of the negative electrode tab extend in opposite directions.

With the use of the foregoing structure, as the first connecting portions of the positive electrode tab and the negative electrode tab extend in opposite directions, the tab can meet the setting requirements of different types of electrode terminals. For example, when the electrode terminal is located between the second connecting portions of the positive electrode tab and the negative electrode tab, the two first connecting portions extend in directions approaching each other. When the electrode terminal is located on both sides of the second connecting portions of the positive electrode tab and the negative electrode tab, the two first connecting portions extend in directions back away from each other.

In some optional embodiments of this application, the housing includes a first wall, the electrode terminal is disposed on the first wall, and the end face faces the first wall.

In some optional embodiments of this application, the electrode terminal is located at one end of the first wall, and the positive electrode tab and the negative electrode tab extend in directions leaving each other.

With the use of the foregoing structure, as the electrode terminal is disposed at the end of the first wall and the positive electrode tab and the negative electrode tab extend in directions leaving each other, the lead-out positions of the positive electrode tab and the negative electrode tab on the end face can be gathered towards the center, reducing interference of the positive electrode tab and the negative electrode tab with components on both sides. This furthermore allows for a greater spacing between connection regions on the positive electrode tab and the negative electrode tab, thereby improving the safety of the battery cell.

In some optional embodiments of this application, the first wall is also provided with an insulating plate on a side facing the electrode assembly, and the insulating plate is configured to insulate the first wall from the electrode assembly.

In some optional embodiments of this application, the insulating plate is provided with a protruding block extending towards the end face, the protruding block abuts against the end face, and along the length direction of the end face, a distance between the second connecting portion and the insulating plate is L, where L≥0.5 mm.

With the use of the foregoing structure, limiting the relative distance between the protruding block and the second connecting portion can significantly reduce the problem of short circuit caused by mutual squeezing and abutting between the second connecting portion and the protruding block.

In some optional embodiments of this application, the tab includes multiple layers of sub tabs, and in adjacent two of the layers of sub tabs, a projection of the sub tab close to the electrode terminal on the end face covers a projection of the sub tab far from the electrode terminal.

With the use of the foregoing structure, gradually increasing the size of the sub tabs in the direction towards the electrode terminal allows the sub tab on a side close to the electrode terminal to completely cover the sub tab on a side away from the electrode terminal, improving the current carrying capacity of the tab and reducing interference of the tab with the protruding block.

In some optional embodiments of this application, the first connecting portion is bent relative to the second connecting portion.

With the use of the foregoing structure, bending the first connecting portion and the second connecting portion can reduce the space occupied by the tabs, thereby increasing the energy density of the battery cell.

According to a second aspect, an embodiment of this application provides a battery, including the foregoing battery cell.

According to a third aspect, an embodiment of this application provides an electric apparatus, which includes the foregoing battery cell and is configured to provide electrical energy.

Compared with the related art, in the battery cell, the battery, and the electric apparatus of the embodiments of this application, as the first connecting portion exceeds the second connecting portion in the length direction of the end face, the connectable range of the first connecting portion in the length direction of the end face can be expanded, facilitating direct connection of the first connecting portion with the electrode terminal. This optimizes the internal structure of the battery cell, increases the available space for the electrode assembly, and increases the energy density of the battery cell.

BRIEF DESCRIPTION OF DRAWINGS
DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skills in the art may still derive other drawings from the accompanying drawings without creative efforts.

In the accompanying drawings:
1000. vehicle; 100. battery; 200. controller; 300. motor; 110. box; 111. first box portion; 112. second box portion; 101. housing; 1011. end cover; 1012. shell; 102. electrode terminal; 103. electrode assembly; 1. main body portion; 11. end face; 2. tab; 201. positive electrode tab; 202. negative electrode tab; 21. first connecting portion; 211. connection region; 212. first edge; 213. second edge; 22. second connecting portion; 221. first end; 222. second end; 23. notch; 3. insulating plate; and 31. protruding block.

DESCRIPTION OF EMBODIMENTS

The following describes in detail embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by persons skilled in the art to which this application relates. The terms used herein are intended to merely describe the specific embodiments rather than to limit this application. The terms "include", "comprise", and "have" and any other variations thereof in the specification, claims and brief description of drawings of this application are intended to cover non-exclusive inclusions.

In the descriptions of the embodiments of this application, the technical terms "first", "second", and the like are merely intended to distinguish between different objects, and shall not be understood as any indication or implication of relative importance or any implicit indication of the number, specific sequence, or primary-secondary relationship of the technical features indicated.

Reference to "embodiment" in the specification means that specific features, structures, or characteristics described with reference to the embodiment may be included in at least one embodiment of this application. The word "embodiment" appearing in various places in this specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the descriptions of the embodiments of this application, the term "multiple" means more than two (inclusive). Similarly, "multiple groups" means more than two (inclusive) groups, and "multiple pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the means or components mentioned must have specific orientations, or must be constructed or manipulated according to specific orientations, and therefore shall not be construed as any limitations on embodiments of this application.

In the description of the embodiments of this application, unless otherwise specified and defined explicitly, the technical terms "mounting", "connection", "join", and "fastening" should be understood in their general senses. For example, they may refer to a fixed connection, a detachable connection, or an integral connection, may refer to a mechanical connection or an electrical connection, and may refer to a direct connection, an indirect connection through an intermediary, an internal communication between two elements, or an interaction between two elements. Persons of ordinary skills in the art can understand specific meanings of these terms in this application as appropriate to specific situations.

The development of battery technology requires consideration of multiple design factors, such as cycle life and battery safety. The energy density of a battery cell has become a constraint on the further promotion of batteries.

A battery cell typically includes a housing and an electrode assembly, where the electrode assembly is a crucial part for completing the electrochemical process of the battery. It usually consists of electrode plates and a separator, with the electrode plates including a positive electrode plate and a negative electrode plate. The positive electrode plate and negative electrode plate each include a current collector and an active material layer applied to it. The electrochemical process mainly relies on the movement of metal ions, such as lithium ions, between the positive electrode plate and negative electrode plate within the active material layer. Therefore, the energy density of a battery cell is closely related to the volume ratio of the electrode assembly.

The inventors noted that in a battery cell, to lead out the electrical energy from the electrode assembly, an electrode terminal needs to be disposed on the housing. A side of the electrode terminal near the inside of the housing needs to be connected to the electrode assembly. For the convenience of leading out the electrical energy on the electrode assembly, a tab is arranged to be connected with the electrode terminal. However, due to limitation of the production process, it is difficult to completely align the positions of the tab and the electrode terminal. To improve the connection efficiency between the electrode terminal and the tab, a connecting component is usually used to connect the tab with the electrode terminal. Clearly, arranging the connecting component additionally occupies the space in the housing, reducing the space available for the electrode assembly and thus decreasing the energy density of the battery cell.

To alleviate the problem of reduced energy density in the battery cell, the inventors found that adjusting the structure of the tab can efficiently connect the tab to the electrode terminal without a connecting component. This reduces the internal structure of the housing and increases the space available for the electrode assembly, thereby increasing the energy density of the battery.

Based on the foregoing consideration, the inventors of this application have conducted in-depth research and designed a battery cell, a battery, and an electric apparatus.

An embodiment of this application provides an electric apparatus that uses a battery as a power source. The electric apparatus may be but is not limited to a mobile phone, a tablet, a notebook computer, an electric toy, an electric tool, an electric bicycle, an electric car, a ship, or a spacecraft. The electric toy may include a fixed or mobile electric toy, for example, a game console, an electric toy car, an electric toy ship, and an electric toy airplane. The spacecraft may include an airplane, a rocket, a space shuttle, a spaceship, and the like.

For ease of description, the electric apparatus of an embodiment of this application being a vehicle 1000 is used as an example for description of the following embodiments.

Figure 1:
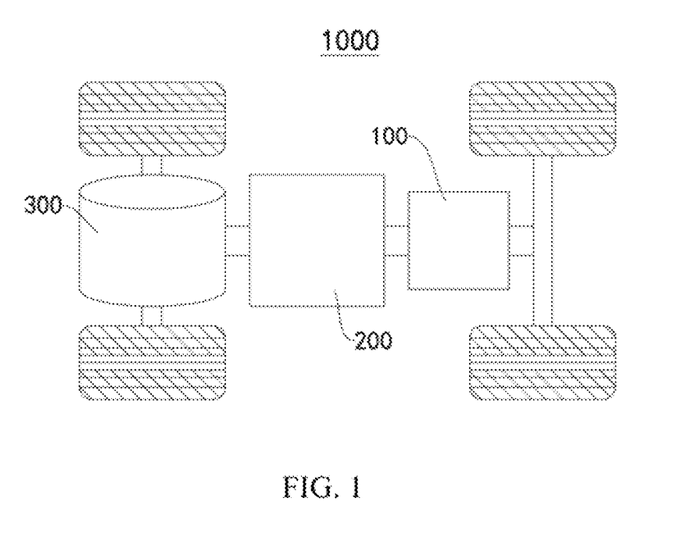
FIG. 1 is a schematic structural diagram of a vehicle according to some embodiments of this application.

As shown in FIG. 1, FIG. 1 is a schematic structural diagram of a vehicle 1000 according to some embodiments of this application. The vehicle 1000 may be a fossil fuel vehicle, a natural-gas vehicle, or a new energy vehicle, where the new energy vehicle may be a battery electric vehicle, a hybrid electric vehicle, a range-extended vehicle, or the like. The vehicle 1000 is provided with a battery 100 inside, where the battery 100 may be disposed at the bottom, front or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

The battery mentioned in the embodiments of this application is a single physical module that includes one or more battery cells for providing higher voltage and capacity. For example, the battery mentioned in this application may include a battery module, a battery pack, or the like.

Figure 2:
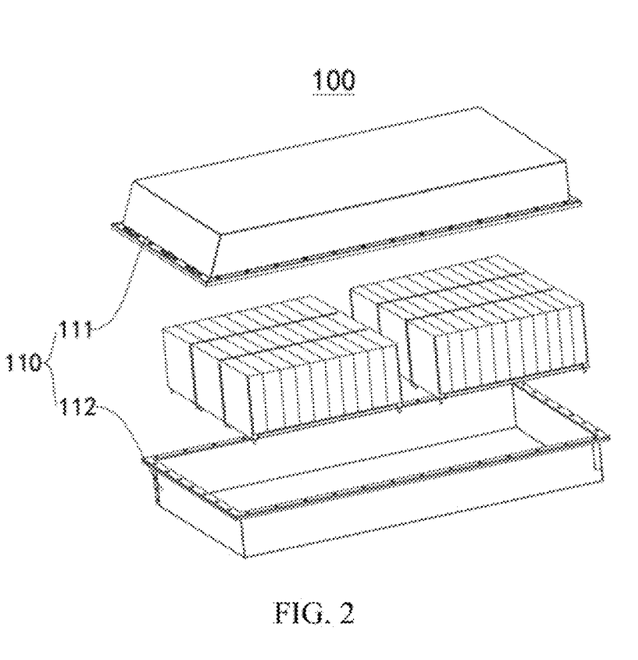
FIG. 2 is a schematic structural diagram of a battery according to some embodiments of this application.

As shown in FIG. 2, FIG. 2 is a schematic structural diagram of a battery 100 according to some embodiments of this application. In some embodiments of this application, the battery 100 includes a box 110. The box 110 may include a first box portion 111 and a second box portion 112 connected together. After connected in parallel, in series, or in parallel and series, multiple battery cells are placed in the space formed by the first box portion 111 and the second box portion 112 through connection. The shapes of the first box portion 111 and the second box portion 112 can be determined according to the shape formed by combined multiple battery cells. The battery cell may be cylindrical, flat, rectangular, or of other shapes. This embodiment of this application does not limit this. According to the packaging methods, the battery cells include but are not limited to cylindrical battery cells, prismatic battery cells, and pouch battery cells. This embodiment of this application does not limit this. In addition, the battery 100 may further include other structures, such as a busbar component configured to achieve electrical connection between multiple battery cells, which is detailed herein.

Figure 3:
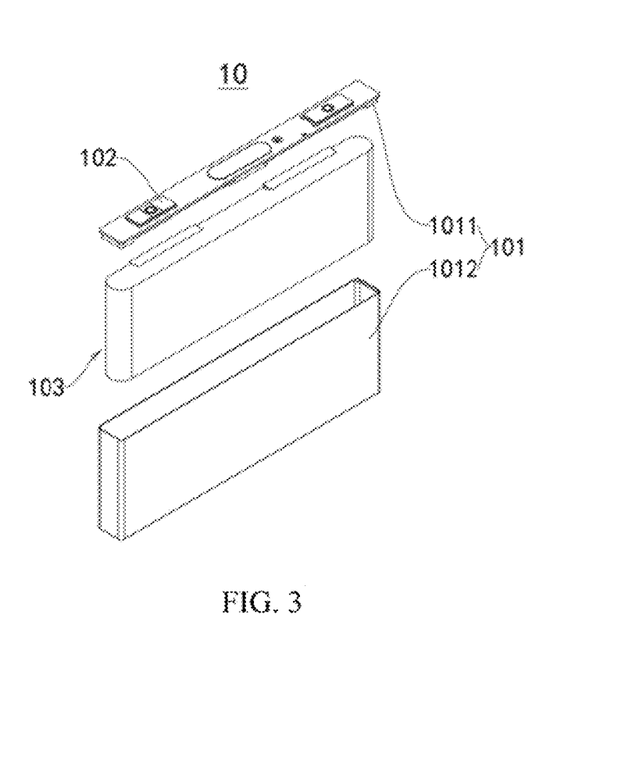
FIG. 3 is a schematic structural diagram of a battery cell according to some embodiments of this application.
Figure 4:
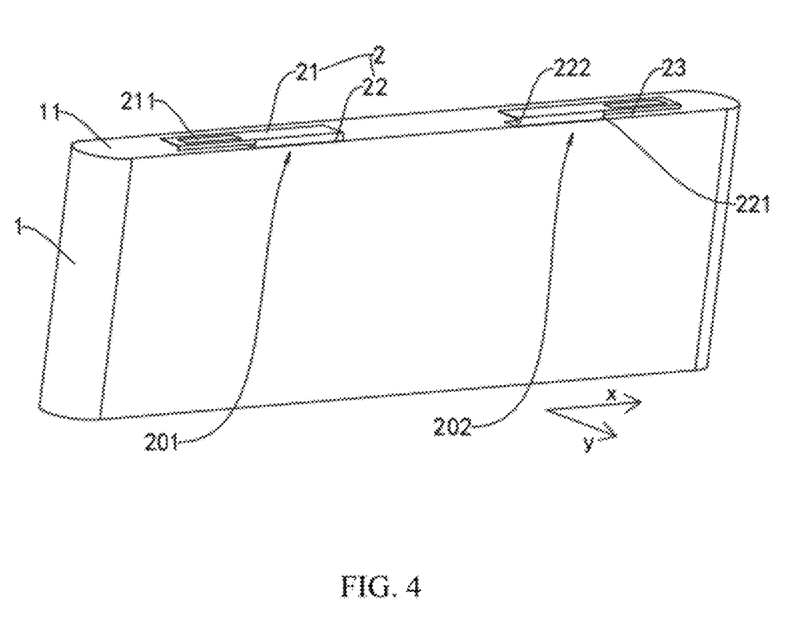
FIG. 4 is a schematic structural diagram of an electrode assembly according to some embodiments of this application.

FIG. 3 is a schematic structural diagram of a battery cell according to some embodiments of this application; FIG. 4 is a schematic structural diagram of an electrode assembly 103 according to some embodiments of this application.

As shown in FIGS. 3 and 4, some embodiments of this application provide a battery cell 10, including a housing 101, an electrode terminal 102, and an electrode assembly 103. The electrode terminal 102 is disposed on the housing 101, and the electrode assembly 103 is accommodated in the housing 101. The electrode assembly 103 includes a main body portion 1 and a tab 2, the tab 2 extends out of an end face 11 of the main body portion 1, the tab 2 includes a first connecting portion 21 and a second connecting portion 22, the first connecting portion 21 is configured to be connected to the electrode terminal 102, and the second connecting portion 22 is configured to be connected to the main body portion 1. Along a length direction (an x-axis direction in FIG. 4) of the end face, at least part of the first connecting portion 21 exceeds the second connecting portion 22.

The housing 101 is a component used for forming the internal environment of the battery cell. The formed internal environment can be used for accommodating the electrode assembly 103, electrolyte (not shown in the figure), and other components. The housing 101 may have various structural forms, such as a cuboid or a cylinder. For example, the shape of the housing 101 can be determined according to the specific shape of the electrode assembly 103. The housing 101 may be made of various materials, such as copper, iron, aluminum, stainless steel, aluminum alloy, and plastic. This is not particularly limited in the embodiments of this application.

The electrode assembly 103 is an assembly used for electrochemical reaction in the battery cell. For example, the electrode assembly 103 is mainly formed by winding or stacking a positive electrode plate and a negative electrode plate, and a separator is usually sandwiched between the positive electrode plate and the negative electrode plate. Part of the positive electrode plate with an active substance, part of the negative electrode plate with the active substance, and the separator constitute the main body portion 1 of the electrode assembly 103. Parts of the positive electrode plate and negative electrode plate without the active substance each form a tab 2. During charge and discharge of the battery, a positive electrode active substance and a negative electrode active substance react with an electrolyte, and the tabs 2 are connected to the electrode terminals 102 to form a current loop.

The electrode terminal 102 is used to be electrically connected with the tab 2, such that the electrical energy is led out of or introduced into the battery cell. For example, the electrode terminal 102 has one end arranged in the housing 101 to be connected with the tab 2, and the other end arranged outside the housing 101.

As the first connecting portion 21 exceeds the second connecting portion 22 in the length direction of the end face, the connectable range of the first connecting portion 21 in the length direction of the end face can be expanded, facilitating direct connection of the first connecting portion 21 with the electrode terminal 102. This optimizes the internal structure of the battery cell, increases the available space for the electrode assembly 103, and increases the energy density of the battery cell.

Optionally, the housing 101 may include a shell 1012 and an end cover 1011. The shell 1012 is a hollow structure with an opening on one side, and the end cover 1011 covers the opening of the shell 1012 to enable a sealed connection, so as to create a sealed space for accommodating the electrode assembly 103 and an electrolyte. The electrode terminal 102 is arranged on the end cover 1011. The electrode terminal 102 may include a positive electrode terminal 102 and a negative electrode terminal 102. The positive electrode terminal 102 and the negative electrode terminal 102 are configured to be connected to a positive electrode tab and a negative electrode tab on the electrode assembly 103, so as to output the electrical energy generated by the electrode assembly 103.

Optionally, the housing 101 may further have other structures. For example, the housing 101 includes a shell 1012 and two end covers 1011. The shell 1012 is a hollow structure with openings on two opposite sides. One end cover 1011 corresponds to and covers one opening of the shell 1012, enabling a sealed connection, so as to create a sealed space for accommodating the electrode assembly 103 and the electrolyte. In this structure, the positive electrode terminal 102 and the negative electrode terminal 102 may be mounted on the same end cover 1011 or on different end covers 1011.

Figure 5:
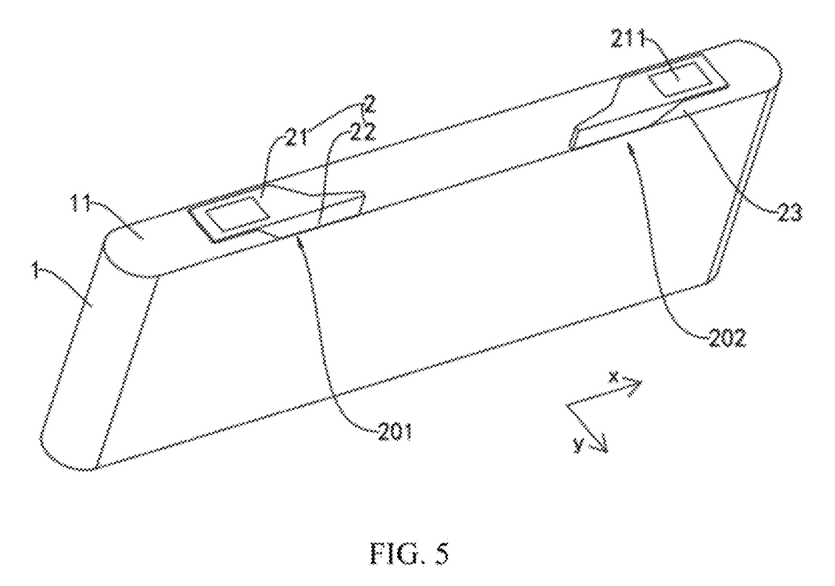
FIG. 5 is a schematic structural diagram of an electrode assembly according to some other embodiments of this application.

FIG. 5 is a schematic structural diagram of an electrode assembly 103 according to some other embodiments of this application. Referring to FIGS. 4 and 5, optionally, in the length direction of the end face (the x-axis direction in FIGS. 4 and 5), the second connecting portion 22 includes a first end 221 and a second end 222 being opposite each other, and the first connecting portion 21 at least extends to exceed one of the first end 221 and the second end 222.

Figure 6:
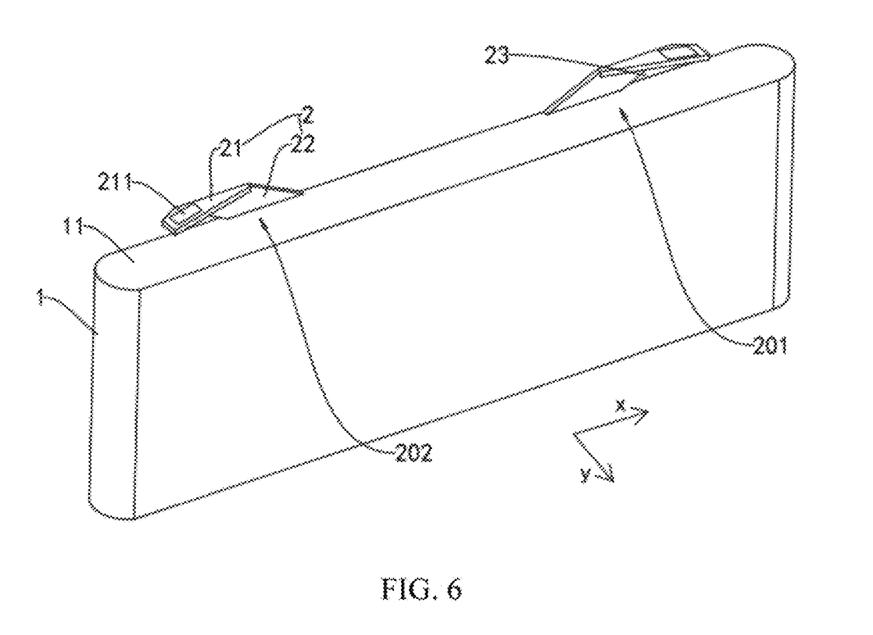
FIG. 6 is a schematic structural diagram of an electrode assembly according to still some other embodiments of this application.
Figure 7:
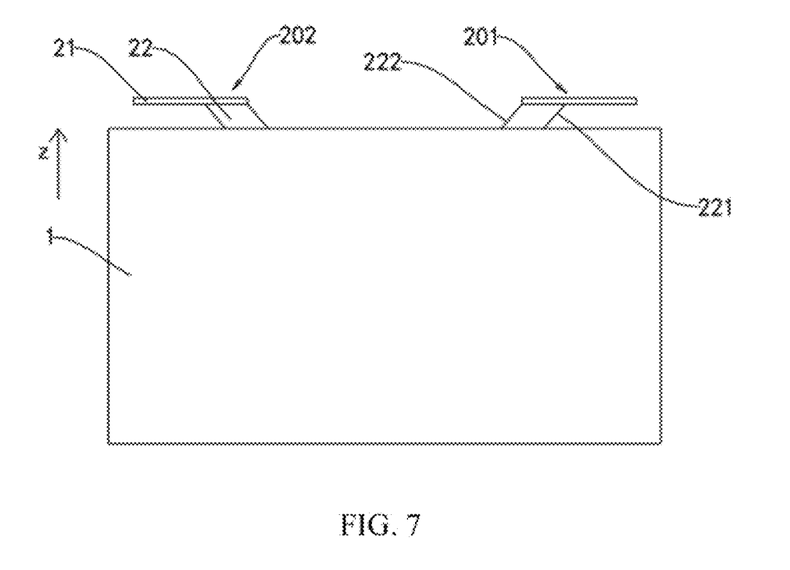
FIG. 7 is a schematic structural front view according to the embodiments in FIG. 6.
Figure 8:
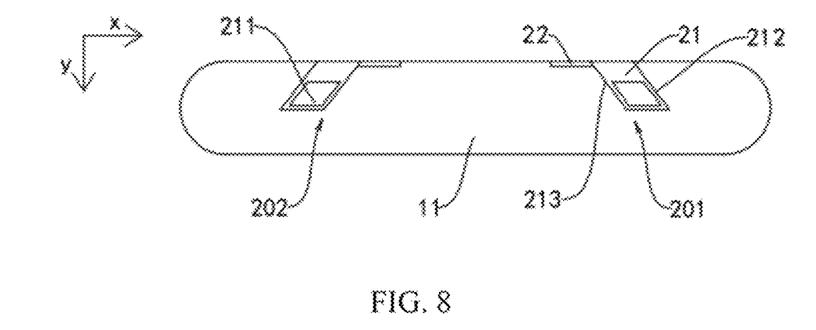
FIG. 8 is a schematic structural top view according to the embodiments in FIG. 6.

FIG. 6 is a schematic structural diagram of an electrode assembly 103 according to still some other embodiments of this application. FIG. 7 is a schematic structural front view according to the embodiments in FIG. 6. FIG. 8 is a schematic structural top view according to the embodiments in FIG. 6. Referencing FIGS. 6 to 8, optionally, in the length direction of the end face (the x-axis direction in FIG. 8), the first connecting portion 21 includes a first edge 212 and a second edge 213, where the first edge and the second edge 213 can be arranged at an included angle with the width direction of the end face (the y-axis direction in FIGS. 6 and 8). Optionally, the first edge 212 and the second edge 213 may be arranged as straight lines or curves.

Referencing FIGS. 6 to 8, optionally, the first end 221 and the second end 222 are arranged at an included angle to the direction perpendicular to the end face (the z-axis direction in FIG. 7).

Optionally, the extension direction of the first connecting portion 21 may be perpendicular to the width direction of the end face, and the extension direction of the second connecting portion 22 may be parallel to the direction perpendicular to the end face, and in the length direction of the end face, the first connecting portion 21 and the second connecting portion 22 staggered. Specifically, along the length direction of the end face, a size of the first connecting portion 21 may be less than a size of the second connecting portion 22.

As shown in FIGS. 4 to 6, in some optional embodiments of this application, the first connecting portion 21 is connected to the electrode terminal 102 to form a connection region 211, and in the length direction of the end face (the x-axis direction in FIGS. 4 to 6), at least part of the connection region exceeds the second connecting portion 22.

The connection region 211 is the connection region between the first connecting portion 21 and the electrode terminal 102 after they are connected. For example, if the first connecting portion 21 is welded to the electrode terminal 102, the connection region 211 is a welded region formed through welding. If the first connecting portion 21 is glued to the electrode terminal 102, the connection region 211 is a glued region formed through gluing.

As the connection region 211 exceeds the second connecting portion 22 along the length direction of the end face, a connection position between the first connecting portion 21 and the electrode terminal 102 can be on an exceeding portion of the first connecting portion 21. Even if a position where the tab 2 is led out is not aligned with the electrode terminal 102, the tab 2 can still be connected to the electrode terminal 102 via the part of the first connecting portion 21 exceeding the second connecting portion 22.

Optionally, in the length direction of the end face (the x-axis direction in FIGS. 4 to 6), the second connecting portion 22 includes a first end 221 and a second end 222 being opposite each other. The connection region 211 may be partially located outside the first end 221 and the second end 222, or may be entirely located outside the first end 221 and the second end 222.

As shown in FIG. 4, in some optional embodiments of this application, in the length direction of the end face (the x-axis direction in FIG. 4), the size of the first connecting portion 21 is greater than the size of the second connecting portion 22. As the size of the first connecting portion 21 is greater than the size of the second connecting portion 22 in the length direction of the end face, the first connecting portion 21 can obtain a larger area, facilitating connection to the electrode terminal 102.

As shown in FIGS. 4 to 6, in some optional embodiments of this application, a notch 23 is provided at the joint between the second connecting portion 22 and the main body portion 1. The arrangement of the notch 23 can shrink a size of a connection position of the second connecting portion 22 to the main body portion 1, increasing a distance between the second connecting portion 22 and another component in the battery cell (for example, an insulating plate between the electrode assembly and the first wall), thereby avoiding interference between the second connecting portion 22 and other components.

As shown in FIG. 4, in some optional embodiments of this application, the tab 2 is L-shaped or T-shaped. As the tab 2 is arranged to be L-shaped or T-shaped, the size of the first connecting portion 21 in the length direction (the x-axis direction in FIG. 4) of the end face can be significantly increased, facilitating connection of the tab 2 with the electrode terminal 102. This also significantly reduces the size of the second connecting portion 22 in the length direction of the end face, preventing the second connecting portion 22 from contacting the protruding block 31.

Optionally, when the tab 2 is L-shaped, the horizontal section of the L-shape is the first connecting portion 21, and the vertical section of the L-shape is the second connecting portion 22. Optionally, when the tab 2 is T-shaped, one of the two edges connected to the center of the other edge is the first connecting portion 21, and the other is the second connecting portion 22.

As shown in FIGS. 3 to 6, in some optional embodiments of this application, the tab 2 includes a positive electrode tab 201 and a negative electrode tab 202, the positive electrode tab 201 and the negative electrode tab 202 are both located on the end face, the positive electrode tab 201 and the negative electrode tab 202 each include a first connecting portion 21 and a second connecting portion 22, and the first connecting portion 21 of the positive electrode tab 201 and the first connecting portion 21 of the negative electrode tab 202 extend in opposite directions.

The first connecting portion 21 of the positive electrode tab 201 and the first connecting portion 21 of the negative electrode tab 202 extend in opposite directions, meaning that the first connecting portion 21 of the positive electrode tab 201 and the first connecting portion 21 of the negative electrode tab 202 may extend in directions approaching each other, or the first connecting portion 21 of the positive electrode tab 201 and the first connecting portion 21 of the negative electrode tab 202 may extend in directions back away from each other.

As the first connecting portions of the positive electrode tab and the negative electrode tab extend in opposite directions, the tab 2 can meet the setting requirements of different types of electrode terminals 102. For example, when the electrode terminal 102 is located between the second connecting portions 22 of the positive electrode tab 201 and the negative electrode tab 202, the two first connecting portions 21 extend in directions approaching each other. When the electrode terminal 102 is located on both sides of the second connecting portions 22 of the positive electrode tab 201 and the negative electrode tab 202, the two first connecting portions 21 extend in directions back away from each other.

Figure 9:
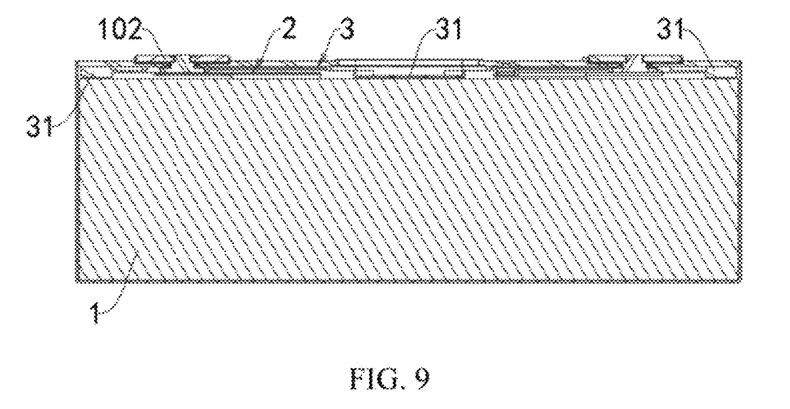
FIG. 9 is a schematic diagram of an internal structure of a battery cell according to some embodiments of this application.
Figure 10:
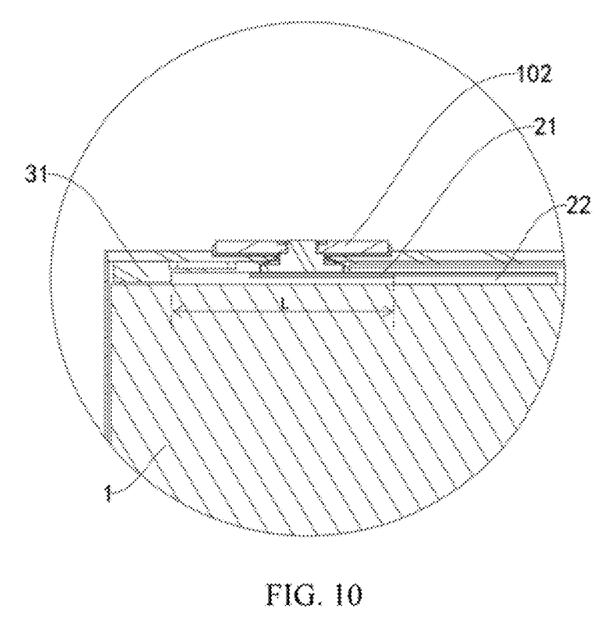
FIG. 10 is a schematic structural diagram at an electrode terminal in FIG. 9.

FIG. 9 is a schematic diagram of an internal structure of a battery cell according to some embodiments of this application. FIG. 10 is a schematic structural diagram at an electrode terminal 102 in FIG. 9.

As shown in FIGS. 3, 9, and 10, in some optional embodiments of this application, the housing 101 includes a first wall, the electrode terminal 102 is disposed on the first wall, and the end face 11 faces the first wall.

As shown in FIGS. 3, 9, and 10, in some optional embodiments of this application, the electrode terminal 102 is located at one end of the first wall, and the positive electrode tab 201 and the negative electrode tab 202 extend in directions leaving each other. As the electrode terminal 102 is disposed at the end of the first wall and the positive electrode tab 201 and the negative electrode tab 202 extend in directions leaving each other, the lead-out positions of the positive electrode tab 201 and the negative electrode tab 202 on the end face 11 can be gathered towards the center, reducing interference of the positive electrode tab 201 and the negative electrode tab 202 with components on both sides. This furthermore allows for a greater spacing between connection regions on the positive electrode tab 201 and the negative electrode tab 202, thereby improving the safety of the battery cell.

As shown in FIGS. 3, 9, and 10, in some optional embodiments of this application, the first wall is also provided with an insulating plate 3 on a side facing the electrode assembly 103, and the insulating plate 3 is configured to insulate the first wall from the electrode assembly 103. The insulating plate 3 may be made of a material such as plastic or rubber.

As shown in FIGS. 3, 9, and 10, in some optional embodiments of this application, the insulating plate 3 is provided with a protruding block 31 extending towards the end face, the protruding block 31 abuts against the end face, and the protruding block 31 can reduce the shaking of the electrode assembly 103.

In some optional embodiments of this application, along the length direction of the end face, a distance between the second connecting portion 22 and the insulating plate is L, where L≥0.5 mm. Limiting the relative distance between the protruding block 31 and the second connecting portion 22 can significantly reduce the problem of short circuit caused by mutual squeezing and abutting between the second connecting portion 22 and the protruding block 31.

In some embodiments, the distance between the second connecting portion 22 and the insulating plate is L, where 0.5 mm≤L≤70 mm. In some embodiments, the distance L between the second connecting portion 22 and the insulating plate may be 1 mm, 3 mm, 5 mm, 10 mm, 20 mm, 30 mm, 40 mm, 50 mm, or 60 mm. In some embodiments, at least three protruding blocks 31 are provided, respectively corresponding to two sides and the middle of the end face. In the length direction of the end face 11, the distance between the second connecting portion 22 and the insulating plate may be a distance between the second connecting portion 22 of the positive electrode tab and one of the protruding blocks 31, and the distance between the second connecting portion 22 and the insulating plate may also be a distance between the second connecting portion 22 of the negative electrode tab and one of the protruding blocks 31.

Figure 11:
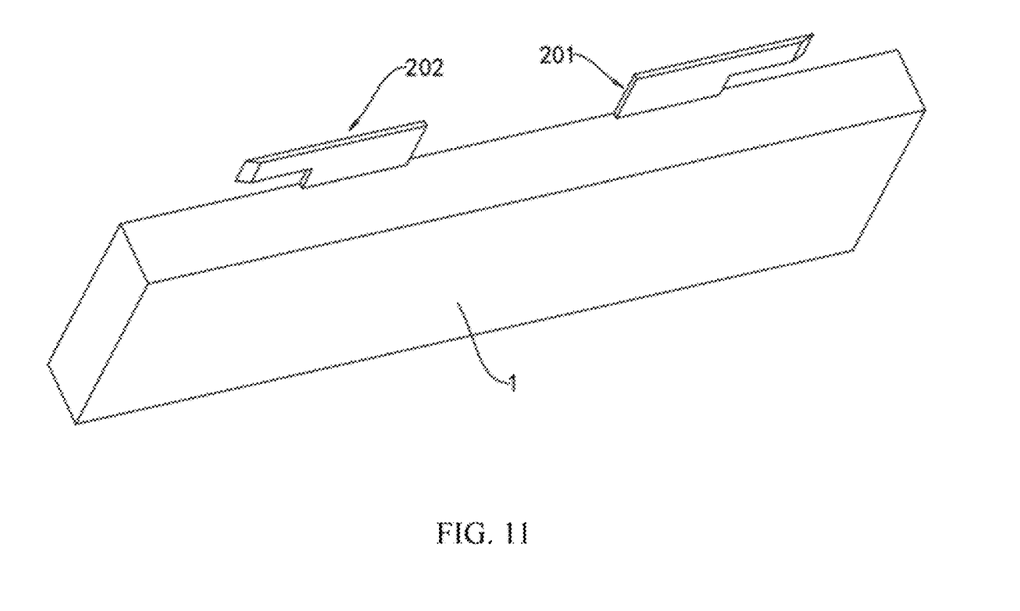
FIG. 11 is a schematic structural diagram of an electrode assembly according to yet some embodiments of this application.

FIG. 11 is a schematic structural diagram of an electrode assembly 103 according to yet some embodiments of this application. As shown in FIG. 11, in some optional embodiments of this application, the tab 2 includes multiple layers of sub tabs, and in adjacent two of the layers of sub tabs, a projection of the sub tab close to the electrode terminal 102 on the end face covers a projection of the sub tab far from the electrode terminal 102. The sizes of the sub tabs are gradually increased in the direction towards the electrode terminal 102, such that the sub tab on a side close to the electrode terminal 102 can completely cover the sub tab on a side away from the electrode terminal 102. The tab 2 is formed by stacking multiple layers of sub tabs. During bending, the sub tab of the inner layer is bent at a small angle, while the sub tab of the outer layer is bent at a large angle. Therefore, with the same size set, the edges of the bent tab 2 are uneven and difficult to standardize. As a result, after placed in the housing 101, the electrode assembly 103 is likely to interfere with it.

In some embodiments, in the direction towards the electrode terminal 102, the area of the sub tabs increases arithmetically or geometrically.

In some embodiments, in the direction towards the electrode terminal 102, the area of the first connecting portion 21 on the sub tabs increases arithmetically or geometrically.

In some optional embodiments of this application, the first connecting portion 21 is bent relative to the second connecting portion 22. Bending the first connecting portion 21 and the second connecting portion 22 can reduce the space occupied by the tabs 2, thereby increasing the energy density of the battery cell.

In some optional embodiments of this application, a battery is further provided, including the foregoing battery cell.

In some optional embodiments of this application, an electric apparatus is also provided, including the foregoing battery cell and configured to provide electrical energy.

In some optional embodiments of this application, a battery cell is also provided, including the housing 101, the electrode terminal 102, and the electrode assembly 103. The electrode terminal 102 is disposed on the housing 101, and the electrode assembly 103 is accommodated in the housing 101. The electrode assembly 103 includes a main body portion 1 and a tab 2, and the tab 2 extends out of an end face 11 of the main body portion 1. The tab 2 includes a first connecting portion 21 and a second connecting portion 22, where the first connecting portion 21 is bent relative to the second connecting portion 22. The first connecting portion 21 is configured to be connected to the electrode terminal 102, and the second connecting portion 22 is configured to be connected to the main body portion 1. Along a length direction of the end face 11, at least part of the first connecting portion 21 exceeds the second connecting portion 22. The first connecting portion 21 is connected to the electrode terminal 102 to form a connection region, and along a length direction of the end face, the connection region exceeds the second connecting portion 22. Along the length direction of the end face, a size of the first connecting portion 21 is greater than a size of the second connecting portion 22. The tab 2 is L-shaped or T-shaped. The tab 2 includes a positive electrode tab 201 and a negative electrode tab 202, the positive electrode tab 201 and the negative electrode tab 202 are both located on the end face, and the positive electrode tab 201 and the negative electrode tab 202 each include a first connecting portion 21 and a second connecting portion 22. The housing 101 includes a first wall, the electrode terminal 102 is disposed on the first wall, and the end face faces the first wall. The electrode terminal 102 is located at one end of the first wall, and the positive electrode tab and the negative electrode tab extend in directions leaving each other. The first wall is also provided with an insulating plate 3 on a side facing the electrode assembly 103, and the insulating plate 3 is configured to insulate the first wall from the electrode assembly 103. The insulating plate 3 is provided with a protruding block 31 extending towards the end face, the protruding block 31 abuts against the end face, and along the length direction of the end face, a distance between the second connecting portion 22 and the insulating plate is L, where L≥0.5 mm. The tab 2 includes multiple layers of sub tabs, and in adjacent two of the layers of sub tabs, a projection of the sub tab close to the electrode terminal 102 on the end face covers a projection of the sub tab far from the electrode terminal 102.

Compared with the related art, in the battery cell, the battery, and the electric apparatus of the embodiments of this application, as the first connecting portion 21 exceeds the second connecting portion 22 in the length direction of the end face, the connectable range of the first connecting portion 21 in the length direction of the end face can be expanded, facilitating direct connection of the first connecting portion 21 with the electrode terminal 102. This optimizes the internal structure of the battery cell, increases the available space for the electrode assembly 103, and increases the energy density of the battery cell.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A battery cell, comprising:
a housing;
an electrode terminal disposed on the housing; and
an electrode assembly accommodated in the housing;
wherein:
   the electrode assembly comprises a main body portion and a tab, the tab extends out of an end face of the main body portion, the tab comprises a first connecting portion and a second connecting portion, the first connecting portion is configured to be connected to the electrode terminal, and the second connecting portion is configured to be connected to the main body portion;
   along a length direction of the end face, at least part of the first connecting portion exceeds the second connecting portion; and
   in the length direction of the end face, the first connecting portion comprises a first edge and a second edge, the first edge is arranged at a first included angle with respect to a width direction of the end face, the second edge is arranged at a second included angle with respect to the width direction of the end face, and the width direction of the end face is perpendicular to the length direction of the end face.

2. The battery cell according to claim 1, wherein the first connecting portion is connected to the electrode terminal to form a connection region, and along a length direction of the end face, at least part of the connection region exceeds the second connecting portion.

3. The battery cell according to claim 1, wherein along the length direction of the end face, a size of the first connecting portion is greater than a size of the second connecting portion.

4. The battery cell according to claim 1, wherein a notch is provided at a joint between the second connecting portion and the main body portion.

5. The battery cell according to claim 1, wherein the tab is L-shaped or T-shaped.

6. The battery cell according to claim 1, wherein the tab comprises a positive electrode tab and a negative electrode tab, the positive electrode tab and the negative electrode tab are both located on the end face, the positive electrode tab and the negative electrode tab each comprise a first connecting portion and a second connecting portion, and the first connecting portion of the positive electrode tab and the first connecting portion of the negative electrode tab extend in opposite directions.

7. The battery cell according to claim 6, wherein the housing comprises a first wall, the electrode terminal is disposed on the first wall, and the end face faces the first wall.

8. The battery cell according to claim 7, wherein the electrode terminal is located at one end of the first wall, and the positive electrode tab and the negative electrode tab extend in directions leaving each other.

9. The battery cell according to claim 7, wherein the first wall is also provided with an insulating plate on a side facing the electrode assembly, and the insulating plate is configured to insulate the first wall from the electrode assembly.

10. The battery cell according to claim 9, wherein the insulating plate is provided with a protruding block extending towards the end face, the protruding block abuts against the end face, and along the length direction of the end face, a distance between the second connecting portion and the insulating plate is L, wherein $L \geq 0.5$ mm.

11. The battery cell according to claim 1, wherein the tab comprises multiple layers of sub tabs, and in adjacent two of the layers of sub tabs, a projection of the sub tab close to the electrode terminal on the end face covers a projection of the sub tab far from the electrode terminal.

12. The battery cell according to claim 1, wherein the first connecting portion is bent relative to the second connecting portion.

13. A battery, comprising the battery cell according to claim 1.

14. An electric apparatus, comprising the battery cell according to claim 1, the battery cell being configured to provide electrical energy.

15. A battery cell, comprising:
a housing;
an electrode terminal disposed on the housing; and
an electrode assembly accommodated in the housing;
wherein:
   the electrode assembly comprises a main body portion and a tab, the tab extends out of an end face of the main body portion, the tab comprises a first connecting portion and a second connecting portion, the first connecting portion is configured to be connected to the electrode terminal, and the second connecting portion is configured to be connected to the main body portion;
   along a length direction of the end face, at least part of the first connecting portion exceeds the second connecting portion; and
   in the length direction of the end face, the first connecting portion and the second connecting portion are staggered, and along the length direction of the end face, a size of the first connecting portion is less than a size of the second connecting portion.

* * * * *